United States Patent [19]

Schafer

[11] 4,045,101
[45] Aug. 30, 1977

[54] MOUNTING FOR MULTI-WORMS IN TRANSMISSIONS FOR DRIVING MULTI-WORM PRESSES FOR PROCESSING SYNTHETIC MATERIAL

[75] Inventor: Heinrich Schafer, Vellmar, Germany

[73] Assignee: Rheinstahl Aktiengesellschaft, Essen, Germany

[21] Appl. No.: 630,133

[22] Filed: Nov. 10, 1975

[30] Foreign Application Priority Data

Nov. 13, 1974 Germany .............................. 2453684

[51] Int. Cl.² .............................................. F16C 9/06
[52] U.S. Cl. ................................................. 308/194
[58] Field of Search ........................... 308/174, 194, 72

[56] References Cited

U.S. PATENT DOCUMENTS

| | | | |
|---|---|---|---|
| 1,049,866 | 1/1913 | Johnston | 308/174 |
| 1,364,675 | 1/1921 | Almfelt | 308/194 |
| 3,403,950 | 10/1968 | Metzger | 308/194 |

Primary Examiner—Richard A. Bertsch
Attorney, Agent, or Firm—Walter Becker

[57] ABSTRACT

A transmission, especially for driving a worm press, in which at least two shafts are supported in parallel relation in a housing with a pair of axially spaced antifriction bearings in the housing for each shaft. Each bearing for each shaft is coplanar with the corresponding bearings of the other shafts. Each bearing outer race has a spherical outer surface and the housing has support members fixed therein with spherical seats engaging the spherical outer surfaces of the bearing outer races. Each bearing outer race is flat on the side facing the adjacent coplanar bearing outer race and compression spring elements are interposed between the flat surfaces which are in opposed relation.

5 Claims, 3 Drawing Figures

MOUNTING FOR MULTI-WORMS IN TRANSMISSIONS FOR DRIVING MULTI-WORM PRESSES FOR PROCESSING SYNTHETIC MATERIAL

The present invention relates to a mounting of multi-worms in transmissions for driving multi-worm presses for processing synthetic materials with two or more transmission driving shafts which are arranged in slightly spaced relationship and parallel to each other and which are mounted in multi-row roller bearings for transmitting high torques.

In transmissions of the above mentioned type, the mounting of the transmission output shafts for driving the worms encounters particular difficulties because, due to the given dimensions of the worms which dimensions depend on reasons relating to the processing technique, the output shafts of the transmission have to be very closely arranged to each other while simultaneously the high driving moments of the worms or the high output driving moments of the transmissions cause correspondingly high tooth forces which lead to a considerable bending of the output shafts and thus bring about inclinations of considerable extent of the output shafts in the highly stressed bearings.

It is known for purposes of journalling the output shafts, in the predetermined narrow space of such transmissions to employ multi-row cylinder roller bearings. The particular construction of such bearings assures a uniform support of the respective rows of cylinder rollers with a predetermined bending of the output shafts. This uniform support of the cylindrical rollers is with the heretofore known mountings of the type involved realized by a conical shape of the originally cylindrically designed race surface of the outer bearing ring, said conical shape following the bending line of the output shaft.

This arrangement has the drawback that the intended uniform support of all rows of rollers occurs only when the torque in conformity with which the geometry of the race surface of the outer bearing ring is determined is precisely kept.

If the transmission output torque is reduced for instance by a change in the composition of the synthetic material to be processed or in view of a change in the processing conditions, automatically also the course of the bending lines of the transmission output shaft changes and thereby also the contact of the rollers with the race surface of the outer bearing ring. A nominal "relief" of the transmission for driving a double worm or multi-worm press for the processing of synthetic material by operation with a lower output torque than that corresponding to the geometry of the race surface of the outer bearing ring can in an extreme case bring about that due to the "relief" only one or two rows of rollers of the original rows of rollers, for instance, of original four or five rows will be load-supporting whereby the still load-supporting rollers are considerably overloaded and the bearing of the transmission output shaft will wear prematurely.

It is, therefore, an object of the present invention to provide a mounting of the above mentioned types so that independently of the magnitude of the output moments occurring in operation, and thereby independently of the bending lines of the transmission output shafts as they occur in operation, always a uniform load support of all rows of rollers of the bearings will be assured.

These and other objects and advantages of the invention will appear more clearly from the following specification in connection with the accompanying drawings, in which.

Figure 1:
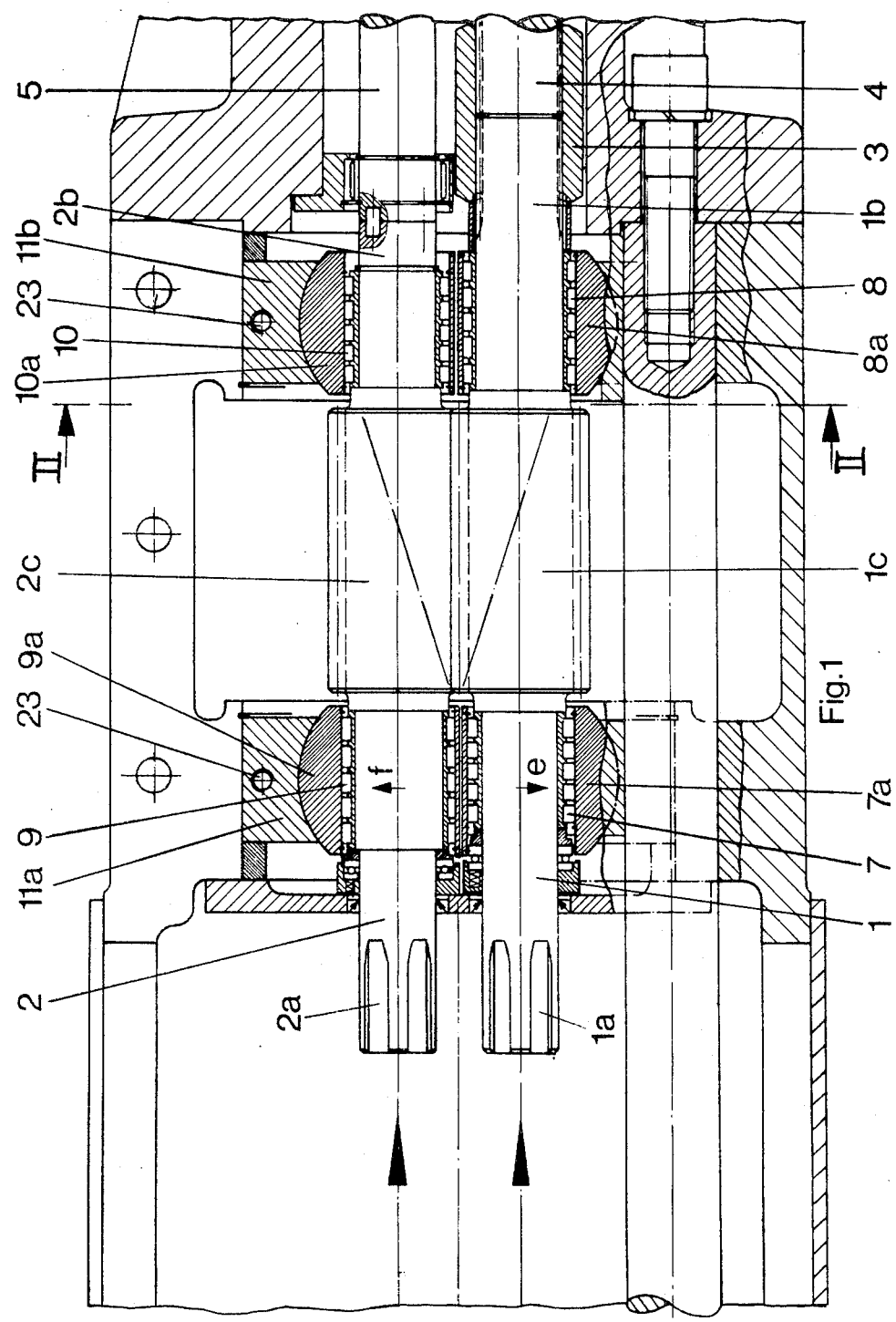
FIG. 1 represents a horizontal section through the mounting of the transmission output shafts of a transmission for driving the worms of a double worm extruder.

The mounting according to the present invention is characterized primarily in that the outer rings of the roller bearings have an outer spherical contour, are flattened between each two adjacent transmission output shafts up to a slight remaining wall thickness, and are pivotally journalled with a gap between the flattened surfaces in a supporting body which is provided with inner spherical seating surfaces and comprises all bearings arranged in one plane, said supporting body being fixedly arranged in the transmission housing.

In order to prevent a possible movement of the outer rings of the bearings in the circumferential direction and thereby impede the pivotal movement of the outer rings by a direct engagement, it is suggested according to a further development of the invention that in the gap between oppositely arranged flattened surfaces of adjacent outer rings there are inserted spring elements such as dish springs or rubber elastic springs.

Referring now to the drawings in detail, the transmission output shafts 1 and 2, which are arranged closely adjacent to each other, have their splined shaft ends 1a and 2a connected to the output ends of the two (non-illustrated) worms of a double worm extruder through the intervention of non-illustrated coupling sleeves. The transmission output shaft 1 is at its splined shaft end 1b driven through the coupling sleeve 3 by shaft 4 journalled in the transmission while the reaction force of the worm driven by the transmission output shaft 1 is transferred to a non-illustrated axial bearing of the shaft 4. The transmission output shaft 1 has its inclined teeth 1c in meshing engagement with the teeth 2c and thus drives the transmission output shaft 2. The reaction force of the worm driven by the transmission output shaft 2 is transferred to a non-illustrated axial bearing through the intervention of the transmission shaft 5 having its end face in engagement with the shaft end 2b of the transmission shaft 2.

For absorbing the radial forces from the transmission of the torque for driving the transmission output shaft 2, the transmission output shafts 1 and 2 are on both sides adjacent their teeth 1c and 2c journalled in multi-row cylinder roller bearings 7, 8 and 9, 10, respectively. The outer rings 7a, 8a and 9a, 10a of said bearings 7, 8; 9, 10 have an outer spherical surface. The outer rings 7a and 9a are pivotally journalled in a supporting body 11a on inner spherical surfaces, whereas the outer rings 8a and 10a are pivotally journalled in a supporting body 11b on inner spherical surfaces. The adjacent outer rings 7a and 9a; 8a and 10a are, as will be evident from FIG. 2, flattened in vertical planes between the transmission shafts 1 and 2, up to a slight remaining wall thickness $a$. Between the flattened surfaces which are located opposite to each other, there is provided a gap $s$ the width of which is expediently so selected that the multi-row cylinder roller bearings 7, 8, 9 and 10 can adjust themselves up to the calculated break load of the teeth 1c and 2c in conformity with the bending lines of the transmission output shafts 1 and 2 without said flattened surfaces contacting each other and impeding the pivotal movements of the outer rings 7a–10a.

In order to prevent the outer rings 7a–10a from moving in circumferential direction, according to the embodiment illustrated in the drawings, in the gap between two flattened surfaces which are located opposite to each other and are provided in the outer rings 7a–10a, spring elements 24 such as dish springs or rubber elastic springs are built in at the upper and lower ends of the flattened surfaces.

Figure 2:
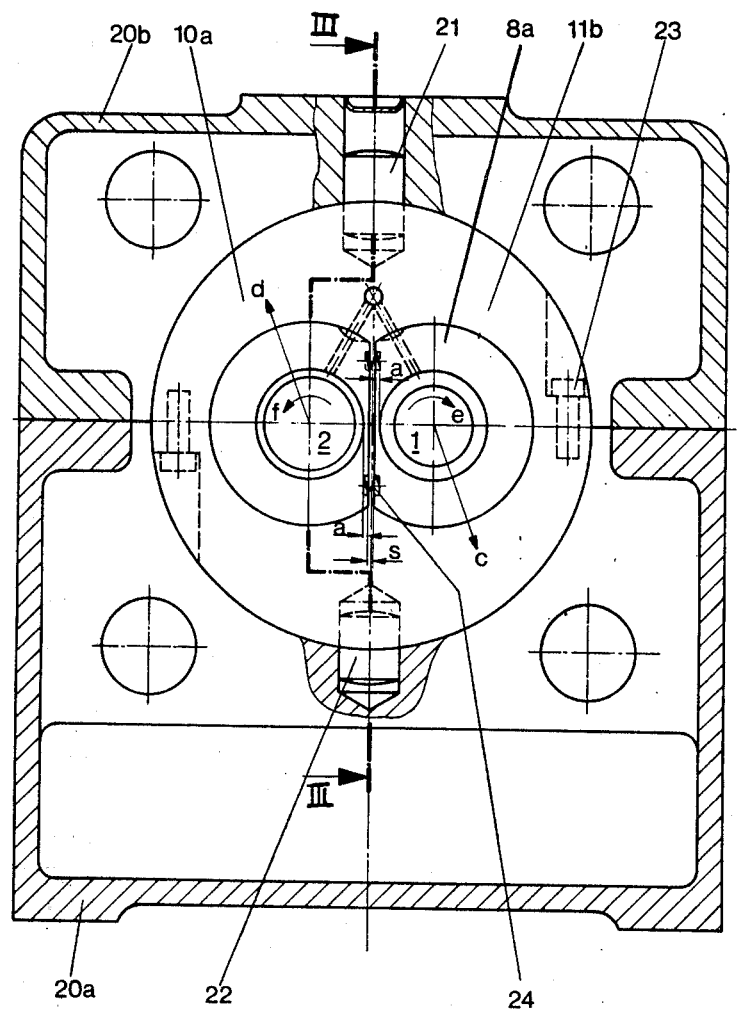
FIG. 2 represents a section taken along the line II—II of FIG. 1 with the end view directed to a supporting body having two pivotal bearings.

From FIG. 2 it will be seen that when the transmission output shafts 1 and 2 turn in the direction of the arrows e and f, the tooth forces c and d in the bearings, which tooth forces depend on the angle of engagement of the teeth, point away from those areas of the outer rings 8a and 10a which have been weakened by the flattened surfaces. This means that the flattened surfaces suggested according to the present invention are located in the non-loaded or stressed zone of the outer rings and therefore do not impede the carrying capability of the multi-row cylinder roller bearings.

Figure 3:
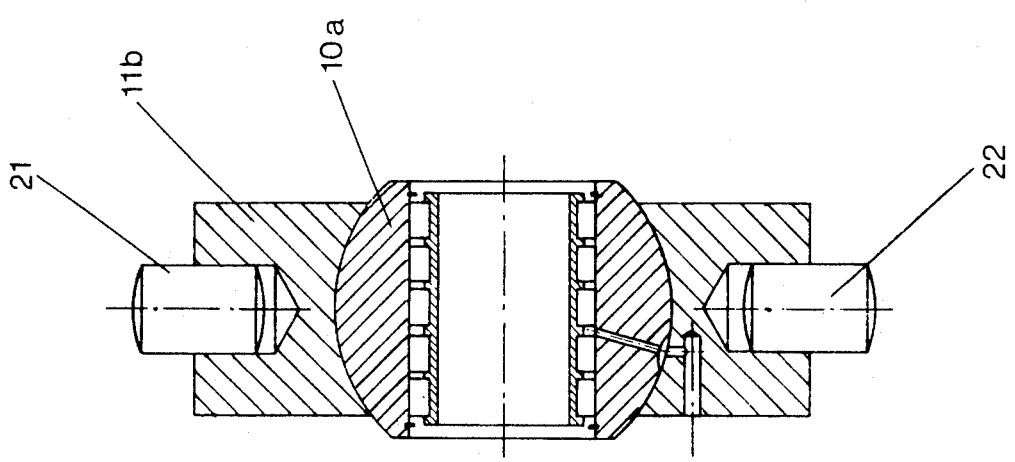
FIG. 3 is a section through a supporting body along the line III—III of FIG. 2.

According to the embodiment of the invention as shown in FIGS. 1–3, the supporting bodies 11a and 11b have an outer cylindrical surface and are firmly journalled in a common bore of the lower transmission housing section 20a and the upper transmission housing section 20b and are by means of pins 21 and 22, which are arranged perpendicularly with regard to the housing parting line, axially secured and also secured in circumferential direction. For purposes of installing the outer rings 7a–10a, the supporting bodies 11a, 11b are in the embodiment shown provided with a horizontal parting gap and are firmly connected to each other by means of tangentially arranged screws 23.

The advantages realized by the present invention consist primarily in that, over heretofore multi-row cylinder bearings with race surfaces of the outer rings which have been calculated specifically for a certain course of the bending lines and are designed correspondingly conically, under all possible conditions of operation a greater safety of operation is realized due to the automatic adaptation of the bearings to the course of the bending lines of the transmission output shafts as they occur in operation.

A further advantage of the present invention consists in that the invention makes it possible with the same diameters of the transmission output shafts to receive additional rows of rollers in the bearings and thereby to increase the supporting capability of the bearing without risking the danger that when the conditions of operation change a non-uniform carrying or supporting of individual rows of rollers may occur.

It is, of course, to be understood that the present invention is, by no means, limited to the specific showing in the drawings but also comprises any modifications within the scope of the appended claims.

What is claimed is:

1. In combination with a transmission, especially for transmitting high torques during driving of a worm press independently of forces exerted on shafts effective in radial direction being distributed uniformly upon adjoining rows of races of radial bearings used for processing synthetic material; a transmission housing, at least two shafts in said transmission housing in parallel spaced relation, a pair of axially spaced antifriction bearings for each shaft with the bearings for the respective shafts being coplanar, each bearing having an inner race on the respective shaft and an outer race over entire periphery thereof seated securely in said housing to assure necessary rigidity and rotary accuracy during high operational speeds and antifriction elements between and rollingly engaging the races, each outer race having the outer surface formed spherically, each adjacent pair of coplanar bearings having the adjacent sides of the outer races thereof formed with flat surfaces which are parallel to the axes of the shafts supported by the respective bearings, said flat surfaces on one side of the outer races of the pair of adjacent bearings being disposed in parallel spaced opposed relation and radially outwardly from the respective antifriction elements, and a supporting body in common and fixed in said transmission housing for each set of coplanar bearings and having spherical seating surfaces engaging the spherical outer surfaces of the outer races of the respective bearings.

2. In a transmission, especially for driving a worm press for processing synthetic material; a housing, at least two shafts in said housing in parallel spaced relation, a pair of axially spaced antifriction bearings for each shaft with the bearings for the respective shafts being coplanar, each bearing having an inner race on the respective shaft and an outer race over entire periphery thereof seated securely in said housing to assure necessary rigidity and rotary accuracy during high operational speeds and antifriction elements between and rollingly engaging the races, each outer race having the outer surface formed spherically, each adjacent pair of coplanar bearings having the adjacent sides of the outer races thereof formed with flat surfaces which are parallel to the axes of the shafts supported by the respective bearings, said flat surfaces on one side of the outer races of the pair of adjacent bearings being disposed in parallel spaced opposed relation and radially outwardly from the respective antifriction elements, and a supporting body in common and fixed in said housing for each set of coplanar bearings and having spherical seating surfaces engaging the spherical outer surfaces of the outer races of the respective bearings, each antifriction bearing being a multiple row roller bearing.

3. In a transmission especially for driving a worm press for processing synthetic material; a housing, at least two shafts in said housing in parallel spaced relation, a pair of axially spaced antifriction bearings for each shaft with the bearings for the respective shafts being coplanar, each bearing having an inner race on the respective shaft and an outer race and antifriction elements between and rollingly engaging the races, each outer race having the outer surface formed spherically, each adjacent pair of coplanar bearings having the adjacent sides of the outer races thereof formed with flat surfaces which are parallel to the axes of the shafts supported by the respective bearings, said flat surfaces on the outer races of the pair of adjacent bearings being disposed in parallel spaced opposed relation and radially outwardly from the respective antifriction elements, and a supporting body fixed in said housing for each set of coplanar bearings and having spherical seating surfaces engaging the spherical outer surfaces of the outer races of the respective bearings, resilient means interposed between each pair of adjacent outer races and biasing the respective outer races toward a position of parallelism of the respective flat surfaces.

4. In a transmission especially for driving a worm press for processing synthetic material; a housing, at least two shafts in said housing in parallel spaced relation, a pair of axially spaced antifriction bearings for each shaft with the bearings for the respective shafts being coplanar, each bearing having an inner race on the respective shaft and an outer race and antifriction elements between and rollingly engaging the races, each outer race having the outer surface formed spherically, each adjacent pair of coplanar bearings having the adjacent sides of the outer races thereof formed with flat surfaces which are parallel to the axes of the shafts supported by the respective bearings, said flat surfaces on the outer races of the pair of adjacent bearings being disposed in parallel spaced opposed relation and radially outwardly from the respective antifriction elements, and a supporting body fixed in said housing for each set of coplanar bearings and having spherical seating surfaces engaging the spherical outer surfaces of the outer races of the respective bearings, resilient spring elements interposed between and compressively engaging the flat surfaces of the outer races of each pair of adjacent coplanar bearings.

5. In a transmission especially for driving a worm press for processing synthetic material; a housing, at least two shafts in said housing in parallel spaced relation, a pair of axially spaced antifriction bearings for each shaft with the bearings for the respective shafts being coplanar, each bearing having an inner race on the respective shaft and an outer race and antifriction elements between and rollingly engaging the races, each outer race having the outer surface formed spherically, each adjacent pair of coplanar bearings having the adjacent sides of the outer races thereof formed with flat surfaces which are parallel to the axes of the shafts supported by the respective bearings, said flat surfaces on the outer races of the pair of adjacent bearings being disposed in parallel spaced opposed relation and radially outwardly from the respective antifriction elements, and a supporting body fixed in said housing for each set of coplanar bearings and having spherical seating surfaces engaging the spherical outer surfaces of the outer races of the respective bearings, resilient spring elements interposed between and compressively engaging the flat surfaces of the outer races of each pair of adjacent coplanar bearings, said spring elements being operable for biasing the respective outer races toward a position of parallelism of the respective flat surfaces.

* * * * *